Patented June 19, 1951

2,557,090

UNITED STATES PATENT OFFICE 2,557,090

COMPOSITION COMPRISING A POLYMERIZED VINYL CHLORIDE RESIN PLASTICIZED WITH MONOALKOXYETHYL DIARYL PHOSPHATE ESTERS

Harry R. Gamrath, St. Louis, and John Kenneth Craver, Webster Groves, Mo., assignors to Monsanto Chemical Company, St. Louis, Mo., a corporation of Delaware No Drawing. Application January 2, 1948, Serial No. 372

17 Claims. (Cl. 260—30.6)

This invention relates to novel compositions comprising monoalkoxyethyl diaryl phosphate esters and polymerized vinyl resins. More particularly, this invention relates to improved plasticized resin compositions containing certain monoalkoxyethyl diaryl phosphate esters and resins containing polymerized vinyl chloride. Resins containing polymerized vinyl chloride which are contemplated as being suitable for the purposes of this invention will be referred to broadly as "polyvinyl chloride resins" with the intention that "polyvinyl chloride resins" include polymerized vinyl chloride (polyvinyl chloride), copolymers of vinyl chloride and compositions containing both polymerized vinyl chloride and vinyl chloride copolymers.

Heretofore, resins such as polyvinyl chloride or copolymer resins such as polyvinyl chloride-acetate, which are normally rigid and brittle in their unplasticized state, have been commonly plasticized with compounds such as dioctyl phthalate, dibutyl sebacate and tricresyl phosphate, and films and sheets formed therefrom possess, in addition to other desirable properties, a durability and flexibility affording them extensive utility as materials for the fabrication of shoes, handbags, seat and cushion coverings, shower curtains and coated fabrics. For many of these uses, it has become necessary and highly desirable that a single plasticizer when incorporated with a polyvinyl chloride resin will produce a plastic composition which will possess the three essential characteristics of low-temperature flexibility, low volatility losses of the plasticizer and non-inflammability, whereas the plasticized compositions known and used up to the present time have been deficient in at least one of these three essential characteristics. In practical use, these articles of manufacture are oftentimes subjected to the freezing temperatures of winter weather and it is necessary that these sheets and films retain their flexibility characteristics at these temperatures. While compositions plasticized with dioctyl phthalate and dibutyl sebacate retain their flexibility at low temperature, these plasticizers have the undesirable quality of being inflammable. In addition, dibutyl sebacate is unsatisfactory as a plasticizer for polyvinyl chloride resin compositions because of its high volatility. On the other hand, when tricresyl phosphate, which is a very good plasticizer from the standpoint of low volatility and non-inflammability, is used to plasticize polyvinyl chloride resins the compositions rapidly lose their flexibility at cooler temperatures and become stiff and hard at freezing temperatures. Although the low-temperature flexibility characteristics of compounds plasticized with tricresyl phosphate are improved to some extent by the use of a secondary plasticizer such as dibutyl phthalate, the compositions are unsatisfactory for many uses because of the high volatility and the inflammability of the dibutyl phthalate. The use of triphenyl phosphate as a plasticizer for polyvinyl chloride resins is not desirable for the reason that triphenyl phosphate is incompatible with polyvinyl chloride resins and a secondary plasticizer must be employed to facilitate compatibility. While trioctyl phosphate is also useful as a plasticizer for polyvinyl chloride resins, the high volatility of trioctyl phosphate is objectionable.

In view of this state of the art it has become highly desirable that a plasticizer be discovered for polyvinyl chloride resin compositions which would not only insure good low-temperature flexibility characteristics but would also insure retention of the plasticizer at higher temperatures, and in addition, inasmuch as polyvinyl chloride resin compositions are being developed for coatings for textiles to be fabricated into clothing, drapes and furniture coverings, as a safety precaution and a fire prevention measure, it is most desirable that the plasticized compositions be non-imflammable. It is most desirable to have a plasticizer which when in combination with polyvinyl chloride resins will produce compositions having the combination of properties of low-temperature flexibility, low volatility losses and non-inflammability.

It is an object of this invention to provide improved and novel polyvinyl chloride resin compositions. A further object is to provide novel plasticized compositions comprising polyvinyl chloride resins and certain monoalkoxyethyl diaryl phosphate esters. A still further object is to provide plasticized polymerized vinyl chloride resin compositions wherein a single plasticizer, when in combination with the polyvinyl chloride resin, produces compositions having at least the three highly desirable characteristics of low-temperature flexibility, low volatility losses of plasticizer and non-inflammability. Further objects will be apparent to those skilled in the art from the following description and claims.

According to the present invention, generally stated, when polymerized vinyl resins, particularly polymerized vinyl chloride and vinyl chloride copolymers, are plasticized with any monoalkoxyethyl diaryl phosphate ester selected from monoalkoxyethyl diphenyl phosphate esters and monoalkoxyethyl dicresyl phosphate esters, wherein the terminal alkyl substituent of the monoalkoxyethyl groups contain at least 4 and not more than 12 carbon atoms, new compositions are formed which possess a group of desirable properties not heretofore obtainable with the formerly used plasticizers.

According to one embodiment of this invention, plastic compositions may be prepared comprising a monoalkoxyethyl diaryl phosphate ester of this invention and any vinyl halide polymer or vinyl halide copolymer which is normally valued for its elastomeric properties when plasticized. Vinyl halide polymers and copolymers which are most commonly known are those containing vinyl chloride although the monoalkoxyethyl diaryl phosphates of this invention may equally well be used to form plastic compositions from other vinyl halides such as vinyl fluoride polymers and copolymers. Polymerized or copolymerized vinyl chloride resin compositions, which are known to those skilled in the art as being elastomeric when plasticized and are valued for their many desirable and useful characteristics, are illustrated by polyvinyl chloride, polyvinyl chloride-acetate, and copolymers of polyvinyl chloride with methyl methacrylate, diethyl maleate or vinylidene chloride. According to another embodiment of this invention, when polyvinyl chloride resins, particularly polyvinyl chloride and polyvinyl chloride copolymers, are plasticized with the monoalkoxyethyl diaryl phosphates of the invention, compositions result which exhibit the desirable combination of excellent low-temperature flexibility characteristics, low volatility losses of plasticizer and non-inflammability; and, in addition, the compositions of this invention possess improved resistance to the absorption of oil. Prior to the present invention, polyvinyl resins plasticized with other known plasticizers which impart good low-temperature flexibility frequently resulted in compositions possessing poor oil absorption resistance. However, compositions plasticized with the monoalkoxyethyl diaryl phosphates of the invention possess excellent low-temperature flexibility characteristics and have improved resistances to oil absorption.

Monoethyl diphenyl phosphate and monomethyl diphenyl phosphate have been disclosed in the art as plasticizers for cellulose esters. However, when it was attempted to use these esters with polyvinyl chloride or copolymers of polyvinyl chloride, the esters decomposed at the working temperatures of the roll mills and, therefore, there was no indication of the utility of this type of phosphate ester as a plasticizer for polyvinyl chloride resins or copolymer resins of polyvinyl chloride.

While, according to this invention, plastic compositions may be prepared from various polyvinyl chloride resins and the monoalkoxyethyl diaryl phosphates as hereinbefore described, the invention is particularly applicable to compositions containing polyvinyl chloride and copolymers of polyvinyl chloride such as polyvinyl chloride-acetate and polyvinyl chloride-vinylidene chloride. While the properties of individual compounds as plasticizers in specific compositions will be shown in examples appearing hereinafter, the plasticizers of this invention are illustrated by the following compounds, although it is not intended that this invention be limited to the following compounds:

Hexoxyethyl diphenyl phosphate
Butoxyethyl diphenyl phosphate
2-ethylbutoxyethyl dicresyl phosphate
2-methylpentoxyethyl diphenyl phosphate
n-Hexoxyethyl dicresyl phosphate
Octoxyethyl dicresyl phosphate
2-ethylhexoxyethyl diphenyl phosphate
Iso-octoxyethyl dicresyl phosphate
n-Octoxyethyl diphenyl phosphate
Nonoxyethyl dicresyl phosphate
Trimethylhexoxyethyl diphenyl phosphate
n-Decoxyethyl dicresyl phosphate
Decoxyethyl diphenyl phosphate
Lauroxyethyl diphenyl phosphate
Dodecoxyethyl dicresyl phosphate
2-n-propylheptoxyethyl dicresyl phosphate In the above examples, the alkyl radicals may be derived, in addition to the conventional sources, from the alcohols manufactured from the polymerization products of olefins.

Suitable plasticizers for the purposes of this invention are those mixtures of monoalkoxyethyl diaryl phosphates wherein the alkyl residues are obtained from a mixture of monohydric alcohols derived from cocoanut oil of which substantially 60% of the alkyl radicals contain at least 8 and not more than 12 carbon atoms.

In the monoalkoxyethyl dicresyl phosphates which are intended to be used in the practice of this invention, the cresyl radical may be an ortho-cresyl, para-cresyl, or meta-cresyl, for example, octyl di-m-cresyl phosphate and octyl m-cresyl p-cresyl phosphate. In general, monoalkoxyethyl dicresyl phosphates wherein the cresyl substituents are derived from meta-cresol are preferred to monoalkoxyethyl dicresyl phosphates wherein the cresyl substituents are derived from ortho-cresol or para-cresol, as the ortho-cresyl derivatives tend toward increased toxicity, and the meta-cresyl derivatives have even better flexibilizing properties than the para-cresyl derivatives.

The monoalkoxyethyl diaryl phosphates of this invention may be prepared in the manner illustrated by the following examples, the description of the preparation of these and other esters being given in detail in our co-pending application, Serial No. 373, filed January 2, 1948, which relates to this type of ester per se and copending applications Serial No. 38,194, filed July 12, 1948, now abandoned and Serial No. 75,098, filed February 7, 1949 now Patent Number 2,504,121, which relate to the process for the preparation of these monoalkoxyethyl diaryl phosphate esters.

*2-methylpentoxyethyl dicresyl phosphate*

153.4 g. of $POCl_3$ are cooled with stirring to about 10° C. in a glass lined closed reaction vessel. 146 g. of ethylene glycol mono-2-methylpentyl ether are cooled to approximately 15° C. and added to the $POCl_3$ with continuous stirring and at a rate so as to maintain a reaction temperature of 20° C. The reaction mixture is agitated and the reaction temperature of 20° C. is maintained for one hour following the addition of all the ethylene glycol mono-2-methylpentyl ether, thereafter the temperature is allowed to rise to approximately 25° C. and the stirring continued for another hour. The hydrogen chloride gas which is evolved from the reaction is continuously removed by means of applying a vacuum to the reaction vessel.

After the reaction between the ethylene glycol mono-2-methylpentyl ether and the $POCl_3$ and the removal of the hydrogen chloride have been completed, the reaction mixture containing the 2-methylpentoxyethyl phosphoryl dichloride is transferred to a reactor containing 780 g. of an aqueous solution, cooled to about 0° C., having a composition of 35% sodium cresylate. When the 2-methylpentoxyethyl phosphoryl dichloride has been added to the alkaline sodium cresylate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer. The crude ester is given successive washes with 2% NaOH solution and water thereby removing the unreacted phenol and partial esters, and reducing the alkalinity of the mass until it is acid to phenolphthalein, and then further refined in accordance with the usual methods well known to those skilled in the art of refining phosphate esters. The yield, based on $POCl_3$, was 79%.

Butoxyethyl diphenyl phosphate 153.4 g. of $POCl_3$ are cooled with stirring to about 15° C. in a glass lined closed reaction vessel. 118.1 g. of ethylene glycol monobutyl ether are cooled and added, with stirring, to the $POCl_3$ over a period of one hour so as to maintain a reaction temperature of about 16° C. The stirring was continued for 1.5 hours after the ethylene glycol monobutyl ether had been added, the temperature being maintained at 15-20° C. and the reaction vessel being held under 50 mm. of vacuum to remove hydrogen chloride gas which was evolved from the reaction. The reaction mixture was substantially butoxyethyl phosphoryl dichloride.

The butoxyethyl phosphoryl dichloride was added to a sodium phenate solution consisting of 243.6 g. of sodium phenate and 450 cc. of water over a period of 2½ hours while maintaining a reaction temperature of 0-3° C. Thereafter the temperature was allowed to rise to 20° C. and the stirring continued for about two additional hours. The reaction mixture was then allowed to stand until an ester layer and an aqueous layer formed and the crude ester layer was then separated from the aqueous layer. The crude ester was given successive washes with 2% NaOH solution and water thereby removing the unreacted phenol and partial esters, and reducing the alkalinity of the mass until it was acid to phenolphthalein, and then further refined in accordance with the usual methods well known to those skilled in the art of refining phosphate esters. The yield, based on $POCl_3$, was 89.0%.

The butoxyethyl diphenyl phosphate which was prepared in the above manner had the following properties:

Sp. gr. 25/25° C. _____ 1.146
$N_D^{25}$ _____ 1.511
Melting point _____ Below —30° C.
Color—very slight yellow coloration

2-ethylhexoxyethyl diphenyl phosphate 174 g. of ethylene glycol mono-2-ethylhexoxyethyl ether were reacted with 153.4 g. of $POCl_3$ in the manner described in the above example to make 2-ethylhexoxyethyl phosphoryl dichloride. This 2-ethylhexoxyethyl phosphoryl dichloride was then added to an aqueous solution of sodium phenate containing 243.6 g. of sodium phenate and 450 cc. of water and the reaction carried out in the manner of the above example to produce 2-ethylhexoxyethyl diphenyl phosphate. The yield, based on $POCl_3$, was 84%. The ester was an oily liquid resembling the butoxyethyl diphenyl phosphate.

The plasticized compositions comprising the polyvinyl resins and any monoalkoxyethyl diaryl phosphate plasticizer of this invention may be prepared by incorporating the plasticizer with the polyvinyl chloride resin to the extent of 20 to 60% of the plasticized composition. In the plasticized resin art, the plasticizer content of plasticized resinous compositions is frequently expressed on the basis of parts by weight of plasticizer per 100 parts of resin. Therefore, according to this manner of expression, the plasticized compositions of this invention may be expressed as containing 25 to 150 parts by weight of the monoalkoxyethyl diaryl phosphate plasticizer per 100 parts of the polyvinyl chloride resin. When the plasticizer content is below the lower limit of 25 parts of the monoalkoxyethyl diaryl phosphate plasticizer per 100 parts of resin, the flexibility characteristics of the resulting composition are seriously impaired, whereas a plasticizer content of 150 parts by weight of the monoalkoxyethyl diaryl phosphate plasticizer per 100 parts of resin approaches the upper limit of practical utility. Moreover, we have found that a plasticized composition having a monoalkoxyethyl diaryl phosphate plasticizer content of 25 to 50% are more desirable (i. e. about 30 to 100 parts by weight of a plasticizer of this invention per 100 parts of polyvinyl chloride resin), and plasticized polyvinyl chloride resin compositions having a monoalkoxyethyl diaryl phosphate plasticizer content of 30 to 45% (i. e. about 40 to 80 parts of a plasticizer of this invention per 100 parts of resin) are preferred compositions.

The plasticizer may be incorporated into the composition comprising the polyvinyl resin and the monoalkoxyethyl diaryl phosphate on a two-roll differential speed mill with a roll temperature of between 100 and 170° C., although a temperature of 120 to 140° C. was found to be quite satisfactory. The preferable rolling conditions for sheets are accomplished when the "hot" roll is maintained at 100-170° C. and the other roll is maintained at a temperature 15 to 20° C. below the temperature of the "hot" roll. Other means of the plasticizers described in this invention, be used provided a composition temperature is maintained between 100 and 170° C.

For purposes of comparison and indicating the outstanding results to be obtained by the use of the plasticizers described in this invention, the following table is presented showing the characteristics of polyvinyl chloride plasticized with the commonly used plasticizers in the amount of 40% of the total weight of the composition:

| Low Temp. Flexibility Point | Volatility, Per Cent Loss | Inflammability | Abrasion Resistance, mg./1,000 cy | Oil Resistance, Per Cent Abs. |
|---|---|---|---|---|
| DOP [1] —38° C | 4.5 | .125 sq. cm./sec | 158 | 19.6 |
| DBS [2] —70° C | 54.6 | Inflammable | 146 | ([4]) |
| TCP [3] —13° C | 0.7 | Non-inflam | 231 | 7.3 |

[1] DOP=Dioctyl phthalate.
[2] DBS=Dibutyl sebacate.
[3] TCP=Tricresyl phosphate.
[4] Leaches out 10%.

The following methods, which are well known to those persons skilled in the art of plasticizing resinous compositions, were used in testing all of the plastic compositions described:

The low temperature flexibility points, by the method described by Clash and Berg, Ind., Eng. Chem., 34, 1218 (1942). Volatility, samples containing 40% by weight of plasticizers were exposed for 24 hours at 105° C. in a Freas Circulating oven, and the loss in weight was calculated as per cent loss of plasticizer. Inflammability, in accordance with ASTM D568-43, method B. Herein, throughout the specification and claims, the use of the term "non-inflammable" means that the plasticized composition did not, or will not, ignite when tested in accordance with ASTM 568-43, method B. Oil resistance, in accordance with ASTM D543-43, and the increase in weight was reported as per cent oil absorbed, and any loss in weight was reported as per cent plasticizer leached out; a Socony-Vacuum oil, meeting the specifications of the ASTM D543-43 test, was used in all of the oil resistance determinations. Abrasion resistance, a Taber abraser using H-22 wheels and 1,000 g. load was employed and results reported as mg. loss per 1,000 cycles.

The following examples illustrate the advantageous and unexpected results to be achieved by the use of the monoalkoxyethyl diaryl phosphates of the present invention in polyvinyl resin compositions, but it is not intended that this invention be limited by or to the examples:

*Example I*

A mixture of three parts by weight of polyvinyl chloride and two parts by weight of butoxyethyl diphenyl phosphate was worked on a differential speed roll mill with one roll at a temperature of 140° C. until a homogeneous composition was formed. A sheet of the composition was cut from the roll and after cooling, a portion of this sheet was placed in a mold in a hydraulic press at a temperature of 325° F. and molded to form a sheet of 0.040" thickness. Upon removing the molded sheet from the press, the following evaluation tests were run in accordance with the directions contained in the references hereinabove set out, and the following tabulated results were observed:

| Low Temp. Flex. | Volatility | Inflammability | Abrasion Resistance | Oil Resistance |
|---|---|---|---|---|
| −29° C. | 6.5% | Non-inflam. | 71 mg. | 5.3% |

The results of this example show that polyvinyl chloride compositions plasticized with butoxyethyl diphenyl phosphate possess the combination of the most desirable characteristics for plasticized compositions, namely, those of good low-temperature flexibility, low volatility loss of the plasticizer and non-inflammability. Moreover, the plasticized composition exhibited an improved resistance to oil absorption which is highly desirable and unexpected, for the reason that plasticizers imparting good low-temperature flexibility characteristics frequently have very poor resistance to oil absorption. It is also pointed out that the loss due to abrasion wear was only about one-half of that of the polyvinyl chloride compositions plasticized with dioctyl phthalate, dibutyl sebacate or tricresyl phosphate.

*Example II*

A mixture of sixty-five parts by weight of polyvinyl chloride and thirty-five parts by weight of butoxyethyl diphenyl phosphate was worked on a differential speed roll mill with one roll at a temperature of 140° C. until a homogeneous composition was formed. A sheet of the composition was cut from the roll and after cooling, a portion of this sheet was placed in a mold in a hydraulic press at a temperature of 325° F. and molded to form a sheet of 0.40" thickness. Upon removing the molded sheet from the press, the following evaluation tests were run in accordance with the directions contained in the references hereinabove set out, and the following tabulated results were observed:

| Low Temp. Flex. | Volatility | Inflammability |
|---|---|---|
| −19° C. | 7.0% | Non-inflam. |

*Example III*

Seventy parts by weight of polyvinyl chloride were intimately mixed with 30 parts by weight of butoxyethyl diphenyl phosphate and the mixture was worked on a roll mill at 140° C. until a homogeneous composition had been formed. A portion of this composition was then molded into a sheet of 40 mil thickness and when this sheet was evaluated, it exhibited the following properties:

| Low Temp. Flex. | Volatility | Inflammability |
|---|---|---|
| −9° C. | 8.0% | Non-inflam. |

*Example IV*

Three parts by weight of a copolymer of vinyl chloride with vinyl acetate (combined vinyl chloride approximately 92%) were intimately mixed with two parts by weight of 2-methylpentoxyethyl dicresyl phosphate and worked on a roll mill at 135° C. until a homogeneous composition was formed. The cooled sheet then was evaluated with respect to the following properties:

| Low Temp. Flex. | Volatility | Inflammability |
|---|---|---|
| −34° C. | 3.5% | Non-inflam. |

*Example V*

A composition consisting of 60% by weight of a vinyl copolymer resin of vinyl chloride and vinylidene chloride (vinyl chloride comprised 85% by weight of the copolymer resin), 39 by weight of 2-ethylhexoxyethyl diphenyl phosphate and 1% by weight of basic lead silicate (a basic heat stabilizer) was worked on a two-roll differential speed roll mill with the hot roll at 140° C. to form a homogeneous composition. The sheet had a flexibility point below −30° C., a volatility loss of 2% and was non-inflammable.

*Example VI*

A composition consisting of 40% by weight of 2-ethylhexoxyethyl diphenyl phosphate, 1% by weight of basic lead sulfate heat stabilizer and 59% by weight of polyvinyl chloride was worked on the roll mill at 160° C. and subsequently molded to form a sheet of 40 mil thickness. The molded sheet had a flexibility point, by the Clash and Berg method, of −37° C., a volatility loss of 1.5% and was non-inflammable.

*Example VII*

Forty parts by weight of 2-n-propylheptoxyethyl dicresyl phosphate were intimately mixed with 60 parts of polyvinyl chloride and this mixture was worked to a homogeneous composition on a two-roll differential speed roll mill with a hot roll temperature of 145° C. A portion of this composition, after molding into a 40 mil sheet, had a low temperature flexibility point below −40° C., a volatility loss of less than 2% and was non-inflammable.

As stated hereinbefore, other copolymers of vinyl chloride may be plasticized with the monoalkoxyethyl diaryl phosphate plasticizers of this invention and illustrative examples are the copolymers of 95 to 85% by weight of vinyl chloride and 5 to 15% by weight of vinylidene chloride, diethyl maleate or methyl methacrylate.

The monoalkoxyethyl diaryl phosphates of the invention may be used in the preparation of organosols containing polyvinyl chloride resins, and the ordinary solvents, diluents and swelling agents which are well known to the art. Using the monoalkoxyethyl diaryl phosphates of the invention, it is possible to prepare polyvinyl chloride organosols of very high solids content and with a wide range of viscosities ranging from thin mobile liquids to heavy pastes. These polyvinyl chloride organosols are extensively used in the casting of free films and the coating of paper and fabrics with plasticized polyvinyl chloride films.

This application is a continuation-in-part of our co-pending application No. 720,310, filed January 4, 1947 now abandoned.

We claim:

1. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of any monoalkoxyethyl diphenyl phosphate wherein the alkyl radical contains at least 4 and not more than 12 carbon atoms.

2. A plasticized composition comprising polyvinyl chloride and 20 to 60% of a monoalkoxyethyl diphenyl phosphate wherein the alkyl radical contains at least 4 and not more than 12 carbon atoms.

3. A plasticized composition comprising polyvinyl chloride and 30 to 45% of a monoalkoxyethyl diphenyl phosphate wherein the alkyl radical contains at least 4 and not more than 12 carbon atoms.

4. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of butoxyethyl diphenyl phosphate.

5. A plasticized composition comprising polyvinyl chloride and 20 to 60% of butoxyethyl diphenyl phosphate.

6. A plasticized composition comprising polyvinyl chloride and 30 to 45% of butoxyethyl diphenyl phosphate.

7. A plasticized polyvinyl chloride composition comprising a polyvinyl chloride resin selected from the group consisting of polyvinyl chloride and copolymers of predominantly polyvinyl chloride, and containing 20 to 60% by weight of octoxyethyl diphenyl phosphate.

8. A plasticized polyvinyl chloride composition comprising a polyvinyl chloride resin selected from the group consisting of polyvinyl chloride and copolymers vinyl chloride and unsaturated materials copolymerizable therewith and containing at least 85% of combined vinyl chloride, and containing 30 to 45% by weight of 2-ethylhexoxyethyl diphenyl phosphate.

9. A plasticized composition comprising polyvinyl chloride and 20 to 60% by weight of 2-ethylhexoxyethyl diphenyl phosphate.

10. A plasticized composition comprising polyvinyl chloride and 20 to 60% of a monoalkoxyethyl dicresyl phosphate wherein the alkyl radical contains at least 4 and not more than 12 carbon atoms.

11. A plasticized composition comprising polyvinyl chloride and 30 to 45% of a monoalkoxyethyl dicresyl phosphate wherein the alkyl radical contains at least 4 and not more than 12 carbon atoms.

12. A plasticized polyvinyl chloride composition comprising 100 parts by weight of a polyvinyl chloride resin selected from the group consisting of polyvinyl chloride and copolymers vinyl chloride and unsaturated materials copolymerizable therewith and containing at least 85% of combined vinyl chloride, and 25 to 150 parts by weight of any monoalkoxyethyl dicresyl phosphate wherein the alkyl radical contains at least 4 and not more than 12 carbon atoms.

13. A plasticized composition comprising polyvinyl chloride and 20 to 60% of butoxyethyl dicresyl phosphate.

14. A plasticized polyvinyl chloride composition comprising a polyvinyl chloride resin selected from the group consisting of polyvinyl chloride and copolymers vinyl chloride and unsaturated materials copolymerizable therewith and containing at least 85% of combined vinyl chloride, and containing 20 to 60% by weight of butoxyethyl dicresyl phosphate.

15. A plasticized composition comprising polyvinyl chloride and 30 to 45% by weight of butoxyethyl dicresyl phosphate.

16. A plasticized elastomeric polyvinyl chloride composition comprising (1) 100 parts by weight of a polyvinyl chloride resin selected from the group consisting of (a) polyvinyl chloride and (b) copolymers of predominantly vinyl chloride and unsaturated materials copolymerizable therewith and (2) 25 to 150 parts by weight of a monoalkoxyethyl diaryl phosphate ester selected from the group consisting of monoalkoxyethyl diphenyl phosphate esters and monoalkoxyethyl dicresyl phosphate esters wherein the terminal alkyl substituent of the monoalkoxyethyl groups contain at least 4 and not more than 12 carbon atoms.

17. A plasticized polyvinyl chloride composition comprising (1) 100 parts by weight of a polyvinyl chloride resin selected from the group consisting of (a) polyvinyl chloride and (b) copolymers of vinyl chloride and unsaturated materials copolymerizable therewith and containing at least 85% of combined vinyl chloride, and (2) about 40 to 80 parts by weight of a monoalkoxyethyl diaryl phosphate ester selected from the group consisting of monoalkoxyethyl diphenyl phosphate esters and monoalkoxyethyl dicresyl phosphate esters wherein the terminal alkyl substituent of the monoalkoxyethyl groups contain at least 4 and not more than 12 carbon atoms.

HARRY R. GAMRATH.
JOHN KENNETH CRAVER.

REFERENCES CITED

The following references are of record in the file of this patent:

UNITED STATES PATENTS

| Number | Name | Date |
|---|---|---|
| 2,168,587 | Shuman | Aug. 8, 1939 |

OTHER REFERENCES

Industrial and Engineering Chemistry 1933, 25, page 648.

Certificate of Correction

Patent No. 2,557,090                                                          June 19, 1951

HARRY R. GAMRATH ET AL.

It is hereby certified that error appears in the printed specification of the above numbered patent requiring correction as follows:

Column 6, line 50, strike out the words and period "the plasticizers described in this invention." and insert instead *mixing or kneading are well known and may*; column 8, line 8, for "0.40'''" read *0.040''*; line 59, for "39" read *39%*; column 9, line 1, for "37 C." read *37° C.*;

and that the said Letters Patent should be read as corrected above, so that the same may conform to the record of the case in the Patent Office.

Signed and sealed this 4th day of September, A. D. 1951.

[SEAL]

THOMAS F. MURPHY,
                                                               *Assistant Commissioner of Patents.*